United States Patent
Perregaux et al.

(10) Patent No.: US 6,642,964 B1
(45) Date of Patent: Nov. 4, 2003

(54) GEOMETRIC CONFIGURATIONS FOR PHOTOSITES FOR REDUCING MOIRE PATTERNS

(75) Inventors: Alain E. Perregaux, Rochester, NY (US); Jagdish C. Tandon, Fairport, WA (US); Roger L. Triplett, Penfield, NY (US); Xiao-Fan Feng, Vancouver, WA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/211,761

(22) Filed: Dec. 15, 1998

(51) Int. Cl.[7] ................................................ H04N 3/14
(52) U.S. Cl. .................. 348/315; 348/273; 348/275; 348/277; 348/266; 348/272; 358/482; 358/483; 358/512; 358/513
(58) Field of Search ................................ 358/513, 514, 358/482, 483; 348/266, 272, 273, 280, 275

(56) References Cited

U.S. PATENT DOCUMENTS

| | | | |
|---|---|---|---|
| 4,675,727 A | * 6/1987 | Sekizawa et al. | 348/315 |
| 4,709,259 A | * 11/1987 | Suzuki | 348/280 |
| 4,710,803 A | * 12/1987 | Suzuki et al. | 348/275 |
| 4,959,736 A | * 9/1990 | Mino et al. | 358/471 |
| 5,031,032 A | 7/1991 | Perregaux | 358/44 |
| 5,047,871 A | * 9/1991 | Meyer et al. | 358/486 |
| 5,119,181 A | * 6/1992 | Perregaux et al. | 348/275 |
| 5,336,878 A | * 8/1994 | Boyd et al. | 250/208.1 |
| 5,473,513 A | 12/1995 | Quinn | 361/760 |
| 5,488,239 A | 1/1996 | Jung | 257/231 |
| 5,552,828 A | 9/1996 | Perregaux | 348/315 |
| 5,757,520 A | * 5/1998 | Takashima | 348/315 |
| 5,790,297 A | * 8/1998 | Berlin | 359/259 |
| 5,956,087 A | * 9/1999 | Takayama et al. | 348/275 |
| 6,005,619 A | * 12/1999 | Fossum | 348/315 |
| 6,014,232 A | * 1/2000 | Clarke | 358/482 |
| 6,184,929 B1 | * 2/2001 | Noda et al. | 348/315 |
| 6,236,434 B1 | * 5/2001 | Yamada | 348/315 |

\* cited by examiner

Primary Examiner—Andrew Christensen
Assistant Examiner—Brian C Genco
(74) Attorney, Agent, or Firm—P. Daebeler

(57) ABSTRACT

Geometric configurations for photosites found on photosensitive chips for creating electrical signals from an original image, as would be found, for example, in a digital scanner, copier, printer, facsimile machine, or other document generating or reproducing device. The photosensitive chips are mounted on a substrate to form a photosensitive array in a full width scanner or other photosensitive device. The geometric configurations reduce the Moiré patterns to provide a higher quality image.

16 Claims, 11 Drawing Sheets

GEOMETRIC CONFIGURATIONS FOR PHOTOSITES FOR REDUCING MOIRE PATTERNS

Attention is directed U.S. patent application Ser. No. 09/211,765, filed Dec. 15, 1998, entitled, "GEOMETRIC CONFIGURATIONS FOR PHOTOSITES FOR REDUCING MOIRÉ PATTERNS". The disclosures of this application each of which are hereby incorporated by reference in their entirety.

FIELD OF THE INVENTION

The present invention relates to photosensitive chips for creating electrical signals from an original image, as would be found, for example, in a digital scanner, copier, facsimile machine, or other document generating or reproducing device.

BACKGROUND OF THE INVENTION

Image sensor arrays typically comprise a photosensitive array of photosites which raster scan an image bearing document and convert the microscopic image areas viewed by each photosite to image signal charges. Each photosite includes one or more photodiodes, photogates or other photodetection devices. Following an integration period, the image signal charges are amplified and transferred as an analog video signal to a common output line or bus through successively actuated multiplexing transistors.

For high-performance image sensor arrays, a preferred design includes a photosensitive array of photosites of a width comparable to the width of a page being scanned, to permit one-to-one imaging generally without the use of reductive optics as taught in U.S. Pat. No. 5,473,513. In order to provide such a "full-width" array, however, relatively large silicon structures must be used to define the large number of photosites as shown in FIG. 1. A preferred technique to create such a large array is to assemble several photosensitive chips $10_1$ through $10_N$ end to end on a base substrate 20, each chip 10 defining a small photosensitive array thereon. The base substrate 20 is preferably a form of ceramic such as alumina, and the chips 10 are preferably made of silicon or another semiconductor material. N is defined as any whole number.

Alternatively, chip 10 may represent a charged-coupled device (CCD) or another type of photosensitive semiconductor chip.

The chips 10, which are assembled end to end to form one full-width array are created by first creating the circuitry for a plurality of individual chips 10 on a single silicon wafer. The silicon wafer is then cut, or "diced," around the circuit areas to yield discrete chips 10. Typically, the technique for dicing the chips 10 includes a combination of chemical etching and mechanical sawing. Because, on each chip 10, the photosites are spaced with high resolution from one end of a chip 10 to the other, the cutting of the chips 10 from the wafer requires precision dicing. It would be desirable to dice each individual chip 10 with a precise dimension along the photosensitive array of photosites, so that, when a series of chips 10 are assembled end-to-end to form a single page-width photosensitive array, there is a minimum disruption of spacing from an end photosite on one chip 10 to a neighboring photosite at the end of a neighboring chip 10. Typically, there is a small gap 30 between two adjacent chips 10. Ideally, the geometric centers of the photosites should be collinear and the photosites should be uniformly spaced across an entire full-width photosensitive array regardless of the configuration of silicon chips 10 forming the photosensitive array. In the prior art, all of the photosites in the chips 10 were made in a square or rectangular shape to provide a repetitive structure of photosites 40. In this way, the repetitive structure was maintained on a chip-to-chip basis, particularly in the gaps 30 between adjacent chips 10 as shown in FIG. 2.

As shown in FIG. 2, the photosites 40 typically have a rectangular shape, wherein each photosite 40 is smaller in the x-direction (fast scan direction) than the y-direction (slow scan direction or direction of document motion) to allow for electrical isolation, to limit cross talk and to allow for conductive traces to run between photosites. As a result, the optical modulation transfer function (MTF) of the system is higher in the x-direction (fast scan direction) than in the y-direction (slow scan direction). The fact that the document to be scanned moves in the y-direction further reduces the y-MTF. However, the negative consequences of the high x-MTF need to be addressed.

For example, half-tone documents typically have a certain dot frequency in the x-direction. Since a beat occurs between the dot frequency and the frequency of the photosite locations, undesirable Moiré patterns appear on the reproduced documents. Therefore, there is a need for a new photosensitive array of photosites, which reduces or eliminates the Moiré patterns particularly in the x-direction (fast scan direction).

As shown in FIG. 3, there were attempts in the prior art to improve image quality at the boundary of adjacent chips by providing photosites having two different shapes on photosensitive chips. This pattern was generally disclosed in U.S. Pat. No. 5,552,828. The regular photosites 60 have a generally square shape or slightly rectangular shape whereas the end photosites 70 have a trapezoidal shape. The advantage of the generally trapezoidal shape of end photosites 70 is that, while the overall width of each end photosite 70 is equal to that of each regular photosites 60, the geometric center of the end photosites 70 is made slightly closer to the edge of the chip 10 to help compensate for any chip spacing problems between the chips 10. However, this arrangement of hapes does not reduce or eliminate Moiré patterns.

U.S. Pat. No. 5,031,032 discloses a pattern of photosites for a full width photosensitive array with photosites of different colors. Although multiple geometric shapes are used to form a rectangular photosite with the three different primary colors, this arrangement of shapes does not reduce or eliminate Moiré patterns.

SUMMARY OF THE INVENTION

According to a first embodiment of the present invention, there is provided a photosensitive array having a fast scan direction and a slow scan direction, wherein the photosensitive array includes an array of generally rectangular photocollection areas on a chip. Each of the photocollection areas includes first and second complementary shapes, wherein the first complementary shape of one photocollection area and the first complementary shape of another photocollection area form one photosite. The second complementary shape of the one photocollection area and the second complementary shape of the other photocollection area form another photosite. Each complementary shape has a photodetection device such as a photodiode or photogate, and each complementary shape has the same surface area. In addition, the photosites are collinear. This configuration reduces the modulation transfer function in the fast scan direction thereby reducing the Moiré patterns. The photosensitive array may be a linear array or a two-dimensional array. Preferably, the two dimensional array has three rows of photocollection areas for the three primary colors. Further, one photosensitive array may be used to scan an image. Alternatively, a photosensitive array is mounted on a substrate adjacent to a second photosensitive array of complementary shaped photosites wherein the last shape of the photosensitive array and the first shape of the second photosensitive array are preferably complementary. The photosensitive array is preferably an array of generally rectangular buttable photocollection areas extending from one end of the chip to the other. The photosensitive arrays are preferably adapted for end to end assembly with like arrays to form a full width array. The photosensitive arrays can be mounted on a rectangular substrate to end relationship and extend from one end of the substrate to the other to form a full width photosensitive array. Examples of the complementary shapes are triangles and rounded triangles.

According to another embodiment of the present invention, there is provided a photosensitive array having a fast scan direction and a slow scan direction, wherein the photosensitive array includes an array of generally rectangular photocollection areas on a chip. Each of the photocollection areas including first, second, third and fourth complementary shapes, wherein the first and second complementary shapes of one photocollection area and the first and second complementary shapes of another photocollection area form one photosite. The third and fourth complementary shapes of the one photocollection area and the third and fourth complementary shapes of the other photocollection area form another photosite. Each complementary shape has a photodetection device such as a photodiode or photogate, and each complementary shape has the same surface area. In addition, the photosites are collinear. This configuration reduces the modulation transfer function in the fast scan direction thereby reducing the Moiré patterns. The photosensitive array may be a linear array or a two-dimensional array. Preferably, the two dimensional array has three rows of photocollection areas for the three primary colors. Further, one photosensitive array may be used to scan an image. Alternatively, a photosensitive array is mounted on a substrate adjacent to a second photosensitive array of complementary shaped photosites wherein the last shape of the photosensitive array and the first shape of the second photosensitive array are preferably complementary. The photosensitive array is preferably an array of generally rectangular buttable photocollection areas extending from one end of the chip to the other. The photosensitive arrays are preferably adapted for end to end assembly with like arrays to form a full width array. The photosensitive arrays can be mounted on a rectangular substrate to end relationship and extend from one end of the substrate to the other to form a full width photosensitive array. Examples of the complementary shapes are triangles and rounded triangles.

According to another embodiment of the present invention, there is provided a photosensitive array having a fast scan direction and a slow scan direction, wherein the photosensitive array includes an array of generally rectangular photocollection areas on a chip. Each of the photocollection areas includes first and second elliptical shapes, wherein the first elliptical shape of one photocollection area and the first elliptical shape of another photocollection area form one photosite. The second elliptical shape of the one photocollection area and the second elliptical shape of the other photocollection area form another photosite. Each elliptical shape has a photodetection device such as a photodiode or photogate, and each elliptical shape has the same surface area. In addition, the photosites are collinear. This configuration reduces the modulation transfer function in the fast scan direction thereby reducing the Moiré patterns. The photosensitive array may be a linear array or a two-dimensional array. Preferably, the two dimensional array has three rows of photocollection areas for the three primary colors. Further, one photosensitive array may be used to scan an image. Alternatively, a photosensitive array is mounted on a substrate adjacent to a second photosensitive array of complementary shaped photosites wherein the last shape of the photosensitive array and the first shape of the second photosensitive array are preferably complementary. The photosensitive array is preferably an array of generally rectangular buttable photocollection areas extending from one end of the chip to the other. The photosensitive arrays are preferably adapted for end to end assembly with like arrays to form a full width array. The photosensitive arrays can be mounted on a rectangular substrate to end relationship and extend from one end of the substrate to the other to form a full width photosensitive array. An example of an elliptical shape is a circular shape.

According to another embodiment of the present invention, there is provided a photosensitive array having a fast scan direction and a slow scan direction, wherein the photosensitive array includes an array of generally rectangular photocollection areas on a chip. Each of the photocollection areas including first, second, third and fourth elliptical shapes, wherein the first and second elliptical shapes of one photocollection area and the first and second elliptical shapes of another photocollection area form one photosite. The third and fourth elliptical shapes of the one photocollection area and the third and fourth elliptical shapes of the other photocollection area form another photosite. Each elliptical shape has a photodetection device such as a photodiode or photogate, and each elliptical shape has the same surface area. In addition, the photosites are collinear. This configuration reduces the modulation transfer function in the fast scan direction thereby reducing the Moiré patterns. The photosensitive array may be a linear array or a two-dimensional array. For example, the two dimensional array may have three rows of photocollection areas for the three primary colors. Further, one photosensitive array may be used to scan an image. Alternatively, a photosensitive array is mounted on a substrate adjacent to a second photosensitive array of complementary shaped photosites wherein the last shape of the photosensitive array and the first shape of the second photosensitive array are preferably complementary. The photosensitive array is preferably an array of generally rectangular buttable photocollection areas extending from one end of the chip to the other. The photosensitive arrays are preferably adapted for end to end assembly with like arrays to form a full width array. The photosensitive arrays can be mounted on a rectangular substrate to end relationship and extend from one end of the substrate to the other to form a full width photosensitive array. An example of an elliptical shape is a circular shape.

The chips of the embodiments of the present invention can be used for single chip applications or assembled to form full width arrays. The chips can be incorporated into a digital copier including a raster scanner scanning documents to generate digital image signals; a controller directing a raster output scanner to expose a photoconductive belt to create an electrostatic latent image based on image signals received from the raster input scanner; a developer applying toner to the latent image; a transfer station transferring the toner of the latent image to a sheet of paper; and a fuser permanently affixing the toner to the sheet of paper. A raster input scanner includes a plurality of generally rectangular chips, which are mounted on a substrate forming an array of generally rectangular buttable photocollection areas. Each complementary shape has a photodetection device, each complementary shape has the same surface area, and the photosites are collinear. Each of the photocollection areas can include first and second complementary shapes, wherein the first complementary shape of one photocollection area and the first complementary shape of another photocollection area form one photosite. The second complementary shape of the one photocollection area and the second complementary shape of the other photocollection area form the second photosite. Alternatively, each of the photocollection areas can include first, second, third and fourth complementary shapes, wherein the first and second complementary shapes of one photocollection area and the first and second complementary shapes of another photocollection area form one photosite. The third and fourth complementary shapes of the one photocollection area and the third and fourth complementary shapes of the other photocollection area form another photosite. Examples of the complementary shapes are triangles, rounded triangles, ellipses and circles.

DETAILED DESCRIPTION OF THE PRESENT INVENTION

Figure 1:
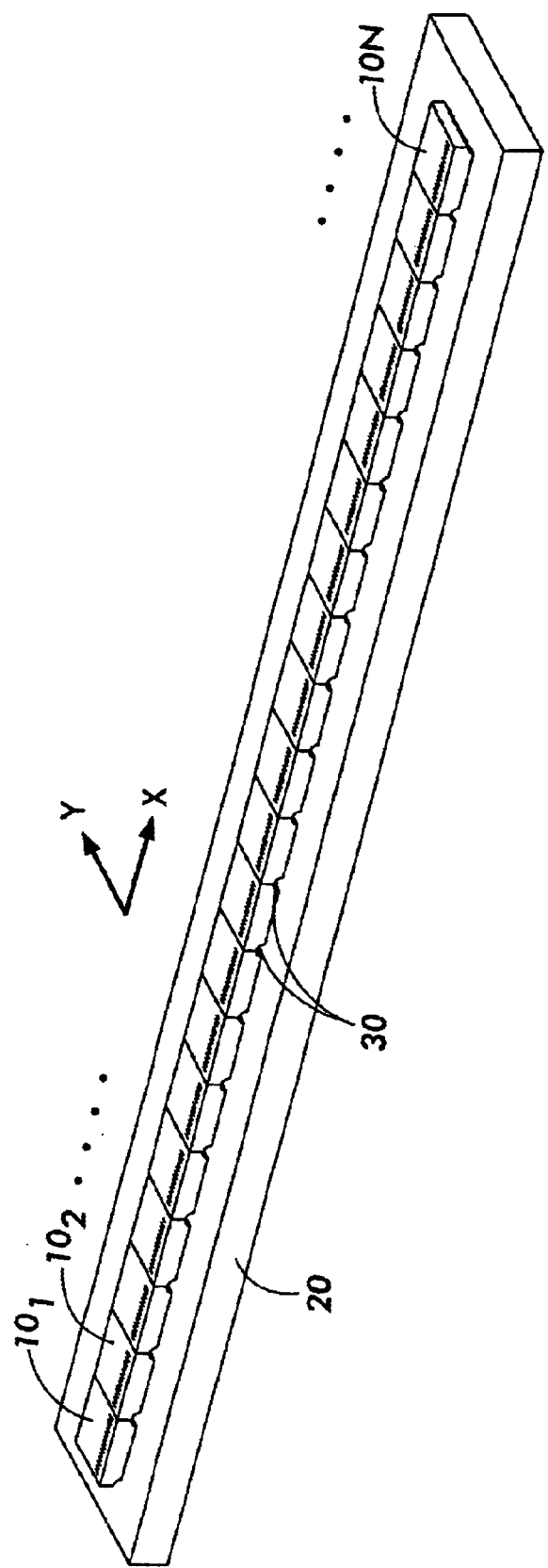
FIG. 1 is a perspective view showing a base substrate having a plurality of assembled photosensitive chips mounted thereon, which form a photosensitive array relevant to the present invention.
Figure 2:
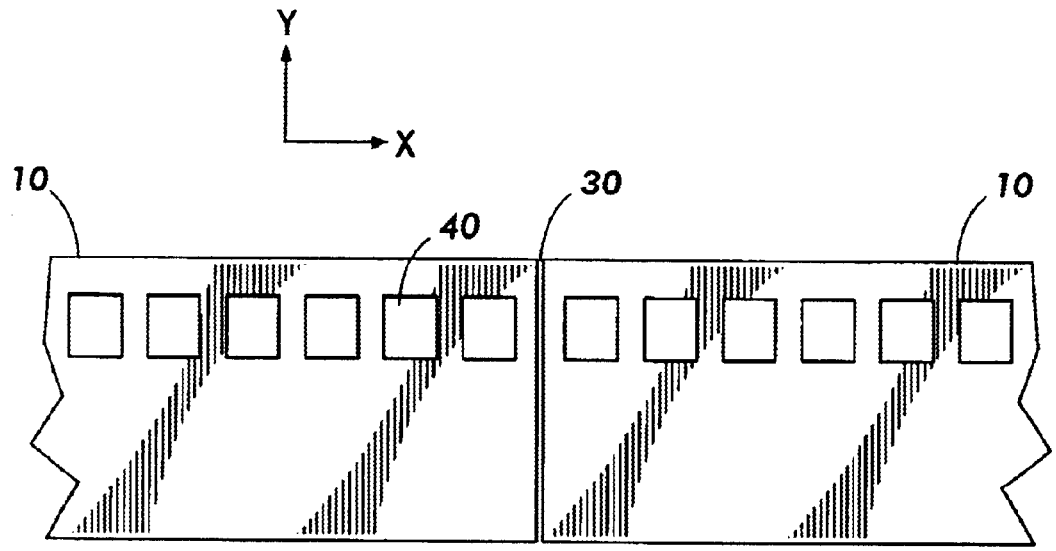
FIG. 2 is a plan view showing a photosensitive array of photosites on two adjacent photosensitive chips in the prior art.
Figure 3:
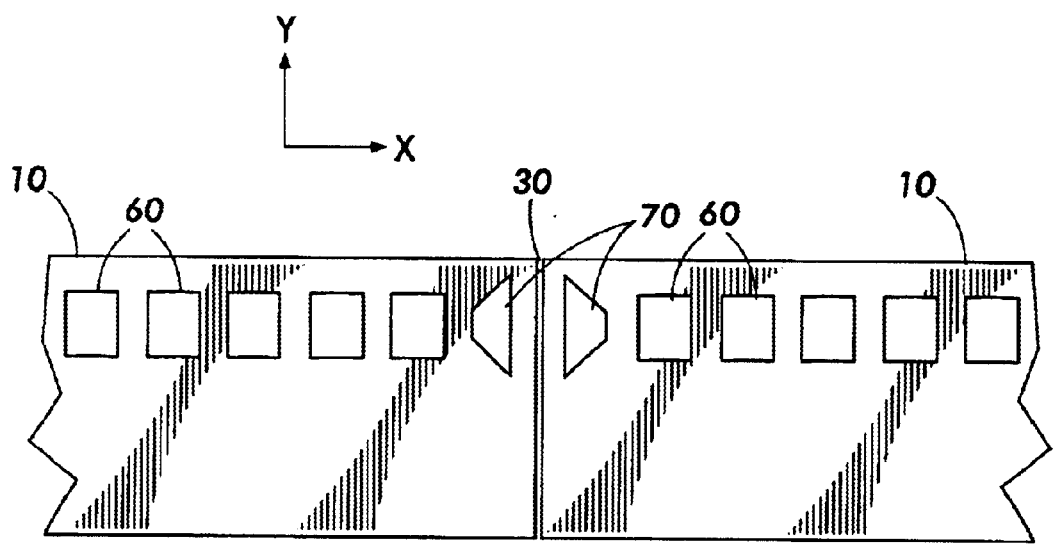
FIG. 3 is a plan view showing portions of two adjacent photosensitive chips, showing regular sites and end photosites thereon in the prior art.

In each of the following Figures, there is shown a plan view of the relevant portions of two photosensitive chips 10 at the general area of juxtaposition along a photosensitive array comprising a plurality of such chips 10. Each chip 10 is preferably made of silicon or another semiconductor material. In each plan view is shown only the main surfaces of the chips 10, having photosensitive structures thereon. At the juxtapositional area between the chips 10 is a very narrow gap 30, which represents spacing between the edges of each chip 10. Each chip 10 includes on the main surface thereof a plurality of photosites, which extend from one end of each chip 10 to the other to form a photosensitive array on each chip 10. Each photosite represents the effective photosensitive area associated with a circuit (not shown) forming a photosensor in each chip 10. Each photosite includes one or more photodetection devices such as photodiodes or photogates.

A chip 10 may be used by itself in a scanning device to scan an image. Although a chip 10 can be used in a single chip application to sense images and reduce Moiré patterns, a plurality of chips 10 are preferably mounted end to end on a substrate 20 to form a full width photosensitive array for sensing images on a document. Preferably the full width photosensitive array is at least as long as one side of the document. However, the chip 10 may also represent a photosensitive CCD array or other photosensitive array, and these chips 10 may be assembled to form a full width photosensitive array. For the purposes of the present invention, the most relevant attribute of each photosensitive array is the geometric shape and spacing of the photosites, and the preferred embodiments are photosensitive arrays on chips 10, which are mounted end to end on substrate 20, which is preferably made of a ceramic such as alumina.

FIGS. 4–19 show preferred embodiments of the invention, which lower the modulation transfer function in the x-direction or fast scan direction by spreading the photosites over larger regions to reduce the Moiré patterns to improve image quality. Further, it is preferable that each outer photosite near the edge of each chip 10, no matter what the specific shape thereof, be of a surface area equal to the surface area defined by each inner photosite. By having equal surface areas defined by each photosite, the overall light sensitivity of all of the photosites, no matter of which type, can be made substantially equal. Further, several of the embodiments employ photosites or photocollection areas, which are buttable. This means that the edge of the photosite or photocollection area closest to the chip edge is also parallel to the chip edge. Further, a photosensitive array may be used in a scanning device to scan an image or can be juxtaposed with one or more photosensitive arrays. Each chip 10 in each embodiment of the present invention may be used for single chip applications or to provide a full width array. Moreover, it is understood by one having ordinary skill in the art that a square is a type of rectangle, and that a circle is a type of ellipse.

Figure 4:
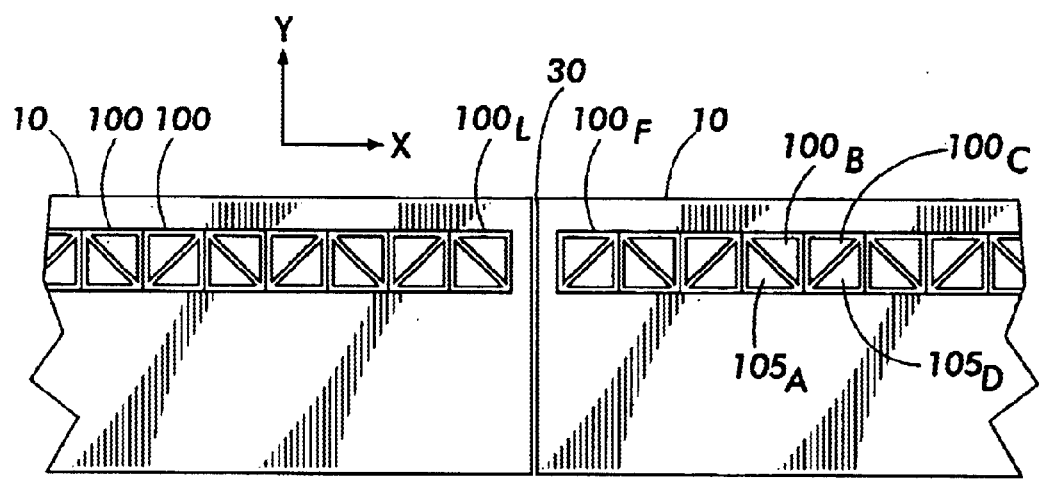
FIG. 4 is a plan view showing portions of a photosensitive array of photosites on two adjacent photosensitive chips in a first preferred embodiment of the present invention.

FIG. 4 shows a plan view of the relevant portions of two chips 10 at the general area of juxtaposition along a full width linear photosensitive array comprising a plurality of the chips 10, each having a linear photosensitive array of the geometric shapes according to the first embodiment of the present invention. In the first embodiment, the linear photosensitive array includes an array of generally rectangular buttable photocollection areas 100, wherein each photocollection area 100 includes two complementary triangular shapes 105. Each chip 10 has two outer photocollection areas denoted as $100_F$ (first buttable rectangular shaped photocollection area) and $100_L$ (last buttable rectangular shaped photocollection area). The other buttable rectangular shaped photocollection areas 100 are inner photocollection areas. All of the photocollection areas preferably have the same surface area and are regularly spaced on the chips 10. Each complementary triangular shape 105 preferably consists of one photodiode, photogate or other photodetection device.

Figure 5:
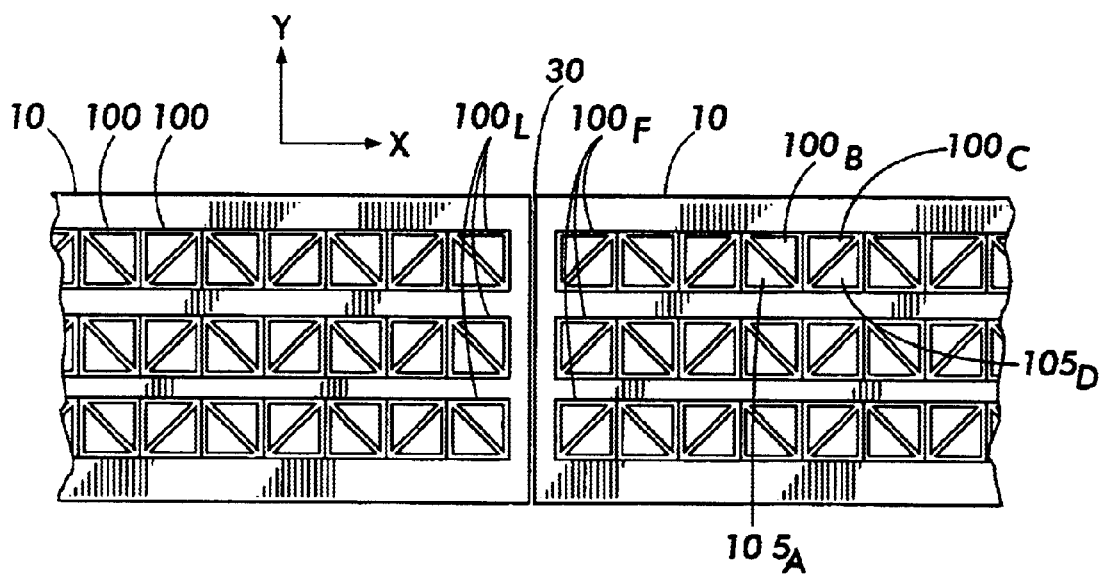
FIG. 5 is a plan view showing portions of a photosensitive array of photosites on two adjacent photosensitive chips in a second preferred embodiment of the present invention.

FIG. 5 shows a plan view of the relevant portions of two chips 10 at the general area of juxtaposition along a full width two dimensional photosensitive array comprising a plurality of the chips 10, each having a two dimensional photosensitive array of the geometric shapes according to the second embodiment of the present invention. Preferably, there are three rows of geometric shapes for the three primary colors. In the second embodiment, the two dimensional photosensitive array includes an array of generally rectangular buttable photocollection areas 100, wherein each photocollection area 100 includes two complementary triangular shapes 105. Each chip 10 has outer photocollection areas denoted as $100_F$ (first buttable rectangular shaped photocollection area) and $100_L$ (last buttable rectangular shaped photocollection area). The other buttable rectangular shaped photocollection areas 100 are inner photocollection areas. All of the photocollection areas preferably have the same surface area and are regularly spaced on the chips 10. Each complementary triangular shape 105 preferably consists of one photodiode, photogate or other photodetection device.

In the first and second embodiments, a first complementary triangular shape $105_A$ from one photocollection area 100 and a first complementary triangular shape $105_C$ from another photocollection area 100 form one photosite. A second complementary triangular shape $105_B$ from the one photocollection area 100 and a second complementary triangular shape $105_D$ from the other photocollection area 100 form another photosite. The advantage of the geometric configurations of the first and second embodiments is that these embodiments lower the modulation transfer function in the x-direction or fast scan direction by spreading the photosites over larger regions, and thus reduce the Moiré patterns to improve image quality. In addition, all of the geometric centers of the photosites are collinear and the outer photocollection areas $100_F$ and $100_L$ are buttable, which further improves image quality. Moreover, the position of the complementary triangular shapes $105_A$–$105_D$ within their respective photocollection areas 100 can change by rotating the positions of the complementary triangular shapes $105_A$–$105_D$ by ninety, one hundred eighty, or two hundred seventy degrees within their respective photocollection areas 100. Therefore, several different geometric configurations may be produced, while spreading the surface area of a photosite over two different photocollection areas 100.

Figure 6:
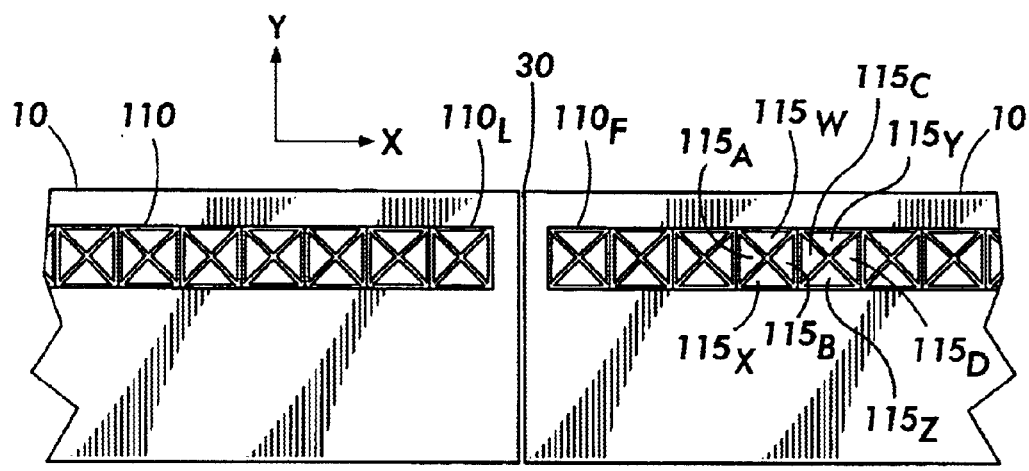
FIG. 6 is a plan view showing portions of a photosensitive array of photosites on two adjacent photosensitive chips in a third preferred embodiment of the present invention.

FIG. 6 shows a plan view of the relevant portions of two chips 10 at the general area of juxtaposition along a full width linear photosensitive array comprising a plurality of the chips 10, each having a linear photosensitive array of the geometric shapes according to the third embodiment of the present invention. In the third embodiment, the linear photosensitive array includes an array of generally buttable rectangular shaped photocollection areas 110, wherein each photocollection area 110 includes four complementary triangular shapes 115. Each chip 10 has two outer photocollection areas denoted as $110_F$ (first buttable rectangular shaped photocollection area) and $110_L$ (last buttable rectangular shaped photocollection area). The other buttable rectangular shaped photocollection areas 110 are inner photocollection areas. All of the photocollection areas preferably have the same surface area and are regularly spaced on the chips 10. Each complementary triangular shape 115 preferably consists of one photodiode, photogate or other photodetection device.

Figure 7:
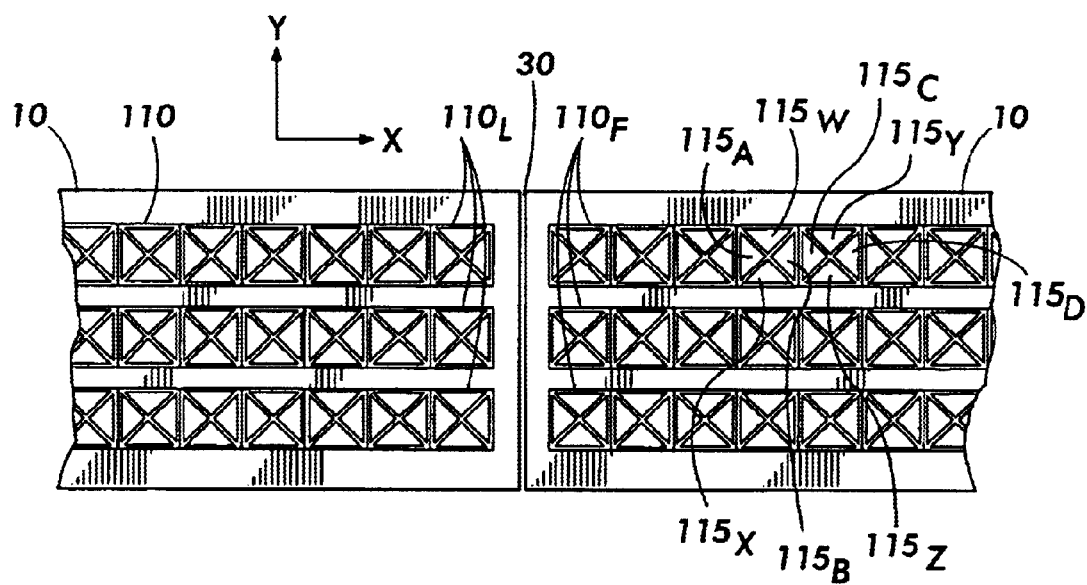
FIG. 7 is a plan view showing portions of a photosensitive array of photosites on two adjacent photosensitive chips in a fourth preferred embodiment of the present invention.

FIG. 7 shows a plan view of the relevant portions of two chips 10 at the general area of juxtaposition along a full width two dimensional photosensitive array comprising a plurality of the chips 10, each having a two dimensional photosensitive array of the geometric shapes according to the fourth embodiment of the present invention. Preferably, there are three rows of geometric shapes for the three primary colors. In the fourth embodiment, the two dimensional photosensitive array includes an array of generally buttable rectangular shaped photocollection areas 110, wherein each photocollection area 110 includes four complementary triangular shapes 115. Each chip 10 has outer photocollection areas denoted as $110_F$ (first buttable rectangular shaped photocollection area) and $110_L$ (last buttable rectangular shaped photocollection area). The other buttable rectangular shaped photocollection areas 110 are inner photocollection areas. All of the photocollection areas preferably have the same surface area and are regularly spaced on the chips 10. Each complementary triangular shape 115 preferably consists of one photodiode, photogate or other photodetection device.

In the third and fourth embodiments, a first complementary triangular shape $115_A$ and a second complementary triangular shape $115_B$ from one photocollection area 110 added to a first complementary triangular shape $115_C$ and a second complementary triangular shape $115_D$ from another photocollection area 110 form one photosite. A third complementary triangular shape $115_W$ and a fourth complementary triangular shape $115_X$ from the one photocollection area 110 added to a third complementary triangular shape $115_Y$ and a fourth complementary triangular shape $115_Z$ from the other photocollection area 110 form another photosite. The advantage of the geometric configurations of the third and fourth embodiments is that these embodiments lower the modulation transfer function in the x-direction or fast scan direction by spreading the photosites over larger regions, and thus reduce the Moiré patterns to improve image quality. In addition, the geometric centers of all of the photosites are preferably collinear and uniformly spaced. Also, the outer photocollection areas $110_L$ and $110_F$ are buttable. These items further improve image quality.

Further, several different geometric configurations in the third and fourth embodiments may be produced, while spreading the surface area of a photosite over two different photocollection areas 110 by changing the complementary triangular shapes 115, which form one photosite. For example, complementary triangular shapes $115_A$, $115_W$, $115_Y$ and $115_C$ may form one photosite while complementary triangular shapes $115_B$, $115_X$, $115_Z$ and $115_D$ form another photosite. In another example, complementary triangular shapes $115_A$, $115_W$, $115_Z$ and $115_D$ may form one photosite while complementary triangular shapes $115_B$, $115_X$, $115_Y$ and $115_C$ form another photosite. Therefore, several different geometric configurations may be produced, while spreading the surface area of a photosite over two different photocollection areas 110.

In addition, although the first through fourth embodiments have used complementary triangular shapes in different photocollection areas to spread out the surface areas of the photosites over a larger region (two photocollection areas), it is understood that other complementary shapes may be substituted for the complementary triangular shapes to spread out the surface areas of the photosites over a larger region. It is also understood that the photosites do not need to be formed from complementary shapes in adjacent photocollection areas. One or more complementary shapes from two or more photocollection areas may be electrically combined to form one photosite.

Figure 8:
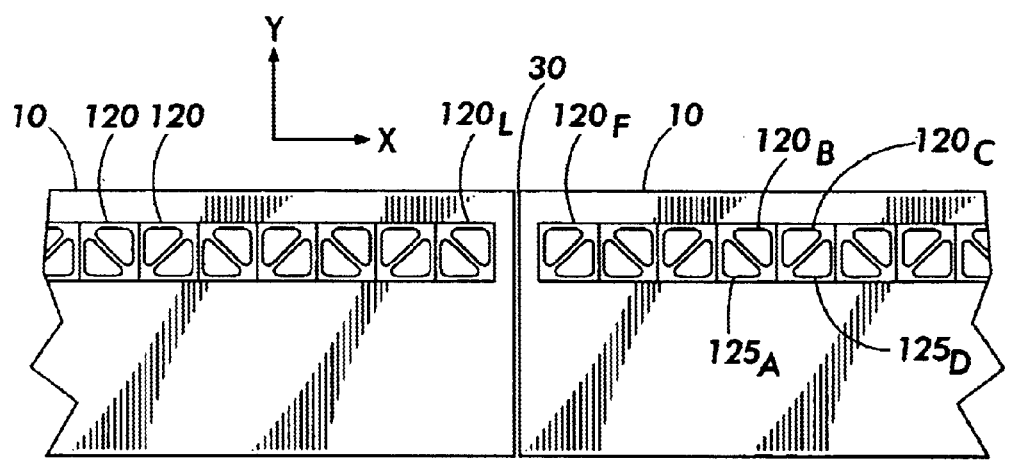
FIG. 8 is a plan view showing portions of a photosensitive array of photosites on two adjacent photosensitive chips in a fifth preferred embodiment of the present invention.

FIG. 8 shows a plan view of the relevant portions of two chips 10 at the general area of juxtaposition along a full width linear photosensitive array comprising a plurality of the chips 10, each having a linear photosensitive array of the geometric shapes according to the fifth embodiment of the present invention. In the fifth embodiment, the linear photosensitive array includes an array of generally rectangular buttable photocollection areas 120, wherein each photocollection area 120 includes two complementary rounded triangular shapes 125. Each chip 10 has two outer photocollection areas denoted as $120_F$ (first buttable rectangular shaped photocollection area) and $120_L$ (last buttable rectangular shaped photocollection area). The other buttable rectangular shaped photocollection areas 120 are inner photocollection areas. All of the photocollection areas preferably have the same surface area and are regularly spaced on the chips 10. Each complementary rounded triangular shape 125 preferably consists of one photodiode, photogate or other photodetection device.

Figure 9:
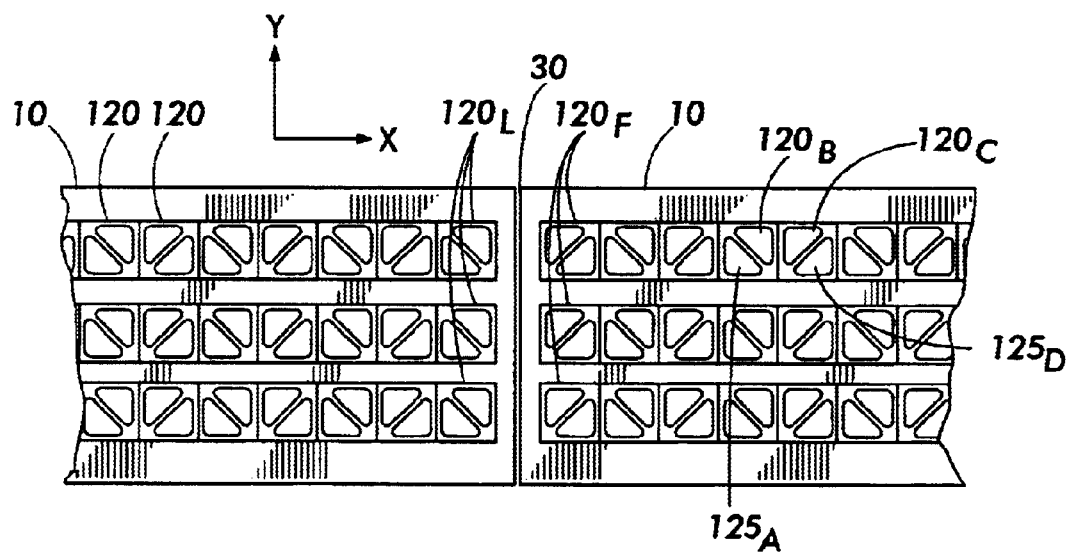
FIG. 9 is a plan view showing portions of a photosensitive array of photosites on two adjacent photosensitive chips in a sixth preferred embodiment of the present invention.

FIG. 9 shows a plan view of the relevant portions of two chips 10 at the general area of juxtaposition along a full width two dimensional photosensitive array comprising a plurality of the chips 10, each having a two dimensional photosensitive array of the geometric shapes according to the sixth embodiment of the present invention. Preferably, there are three rows of geometric shapes for the three primary colors. In the sixth embodiment, the two dimensional photosensitive array includes an array of generally rectangular buttable photocollection areas 120, wherein each photocollection area 120 includes two complementary rounded triangular shapes 125. Each chip 10 has outer photocollection areas denoted as $120_F$ (first buttable rectangular shaped photocollection area) and $120_L$ (last buttable rectangular shaped photocollection area). The other buttable rectangular shaped photocollection areas 120 are inner photocollection areas. All of the photocollection areas preferably have the same surface area and are regularly spaced on the chips 10. Each complementary rounded triangular shape 125 preferably consists of one photodiode, photogate or other photodetection device.

In the fifth and sixth embodiments, a first complementary rounded triangular shape $125_A$ from one photocollection area 120 and a first complementary rounded triangular shape $125_C$ from another photocollection area 120 form one photosite. A second complementary rounded triangular shape $125_B$ from the one photocollection area 120 and a second complementary rounded triangular shape $125_D$ from the other photocollection area 120 form another photosite. The advantage of the geometric configurations of the fifth and sixth embodiments is that these embodiments lower the modulation transfer function in the x-direction or fast scan direction by spreading the photosites over larger regions, and thus reduce the Moiré patterns to improve image quality. In addition, all of the geometric centers of the photosites are collinear and the outer photocollection areas $120_F$ and $120_L$ are buttable, which further improves image quality. Moreover, the position of the complementary rounded triangular shapes $125_A$–$125_D$ within their respective photocollection areas 120 can change by rotating the positions of the complementary rounded triangular shapes $125_A$–$125_D$ by ninety, one hundred eighty, or two hundred seventy degrees within their respective photocollection areas 120. Therefore, several different geometric configurations may be produced, while spreading the surface area of a photosite over two different photocollection areas 120.

Figure 10:
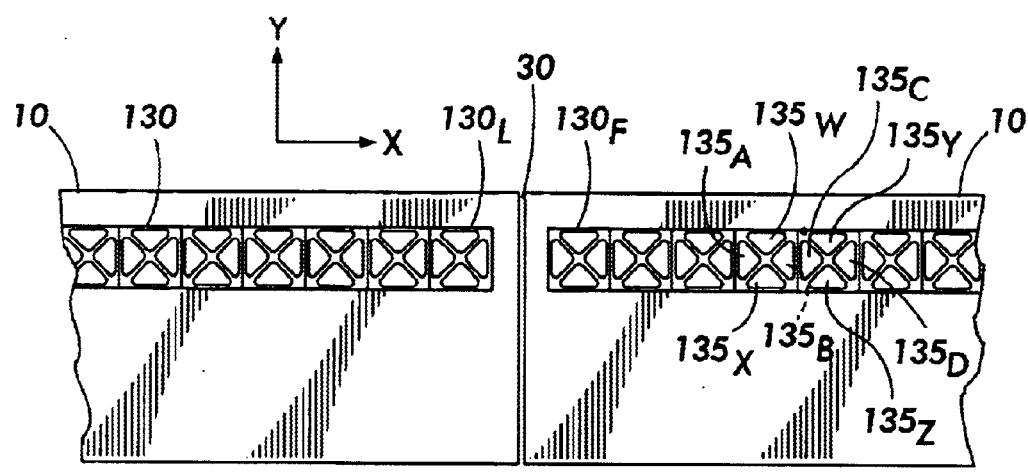
FIG. 10 is a plan view showing portions of a photosensitive array of photosites on two adjacent photosensitive chips in a seventh preferred embodiment of the present invention.

FIG. 10 shows a plan view of the relevant portions of two chips 10 at the general area of juxtaposition along a full width linear photosensitive array comprising a plurality of the chips 10, each having a linear photosensitive array of the geometric shapes according to the seventh embodiment of the present invention. In the seventh embodiment, the linear photosensitive array includes an array of generally buttable rectangular shaped photocollection areas 130, wherein each photocollection area 130 includes four complementary rounded triangular shapes 135. Each chip 10 has two outer photocollection areas denoted as $130_F$ (first buttable rectangular shaped photocollection area) and $130_L$ (last buttable rectangular shaped photocollection area). The other buttable rectangular shaped photocollection areas 130 are inner photocollection areas. All of the photocollection areas preferably have the same surface area and are regularly spaced on the chips 10. Each complementary rounded triangular shape 135 preferably consists of one photodiode, photogate or other photodetection device.

Figure 11:
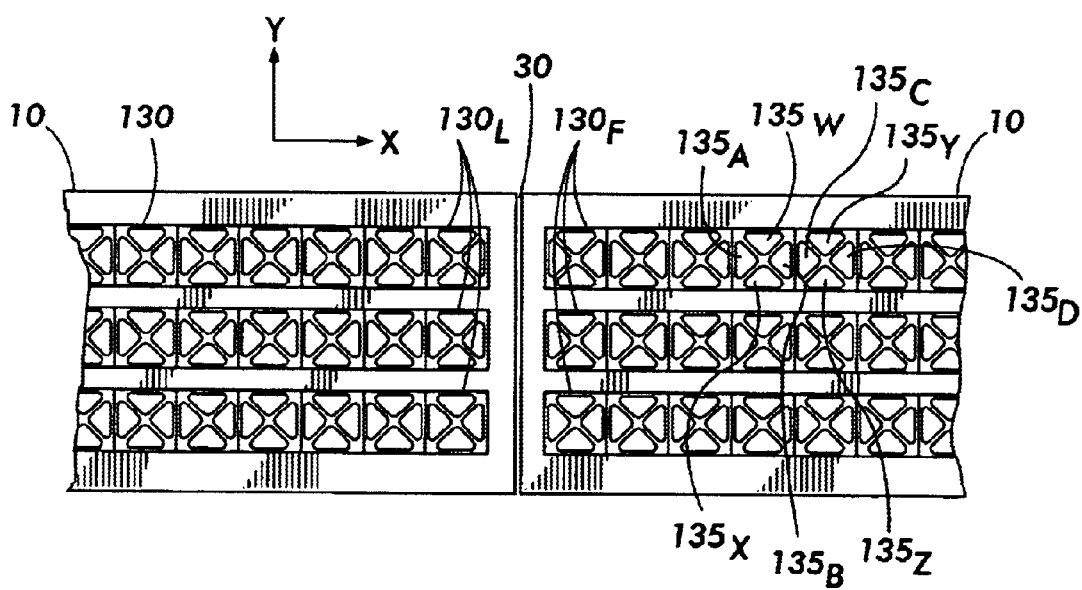
FIG. 11 is a plan view showing portions of a photosensitive array of photosites on two adjacent photosensitive chips in a eighth preferred embodiment of the present invention.

FIG. 11 shows a plan view of the relevant portions of two chips 10 at the general area of juxtaposition along a full width two dimensional photosensitive array comprising a plurality of the chips 10, each having a two dimensional photosensitive array of the geometric shapes according to the eighth embodiment of the present invention. Preferably, there are three rows of geometric shapes for the three primary colors. In the eighth embodiment, the two dimensional photosensitive array includes an array of generally buttable rectangular shaped photocollection areas 130, wherein each photocollection area 130 includes four complementary rounded triangular shapes 135. Each chip 10 has outer photocollection areas denoted as 130$_F$ (first buttable rectangular shaped photocollection area) and 130$_L$ (last buttable rectangular shaped photocollection area). The other buttable rectangular shaped photocollection areas 130 are inner photocollection areas. All of the photocollection areas preferably have the same surface area and are regularly spaced on the chips 10. Each complementary rounded triangular shape 135 preferably consists of one photodiode, photogate or other photodetection device.

In the seventh and eighth embodiments, a first complementary rounded triangular shape 135$_A$ and a second complementary rounded triangular shape 135$_B$ from one photocollection area 130 added to a first complementary rounded triangular shape 135$_C$ and a second complementary rounded triangular shape 135$_D$ from another photocollection area 130 form one photosite. A third complementary rounded triangular shape 135$_W$ and a fourth complementary rounded triangular shape 135$_X$ from the one photocollection area 130 added to a third complementary rounded triangular shape 135$_Y$ and a fourth complementary rounded triangular shape 135$_Z$ from the other photocollection area 130 form another photosite. The advantage of the geometric configurations of the third and fourth embodiments is that these embodiments lower the modulation transfer function in the x-direction or fast scan direction by spreading the photosites over larger regions, and thus reduce the Moiré patterns to improve image quality. In addition, the geometric centers of all of the photosites are preferably collinear and uniformly spaced. Also, the outer photocollection areas 130$_L$ and 130$_F$ are buttable. These items further improve image quality.

Further, several different geometric configurations in the seventh and eighth embodiments may be produced, while spreading the surface area of a photosite over two different photocollection areas 130 by changing the complementary rounded triangular shapes 135, which form one photosite. For example, complementary rounded triangular shapes 135$_A$, 135$_W$, 135$_Y$ and 135$_C$ may form one photosite while complementary rounded triangular shapes 135$_B$, 135$_X$, 135$_Z$ and 135$_D$ form another photosite. Therefore, several different geometric configurations may be produced, while spreading the surface area of a photosite over two different photocollection areas 130.

In addition, although the fifth through eighth embodiments have used complementary rounded triangular shapes in different photocollection areas to spread out the surface areas of the photosites over a larger region (two photocollection areas), it is understood that other complementary shapes may be substituted for the complementary triangular shapes to spread out the surface areas of the photosites over a larger region. It is also understood that the photosites do not need to be formed from complementary shapes in adjacent photocollection areas. One or more complementary shapes from two or more photocollection areas may be electrically combined to form one photosite.

Figure 12:
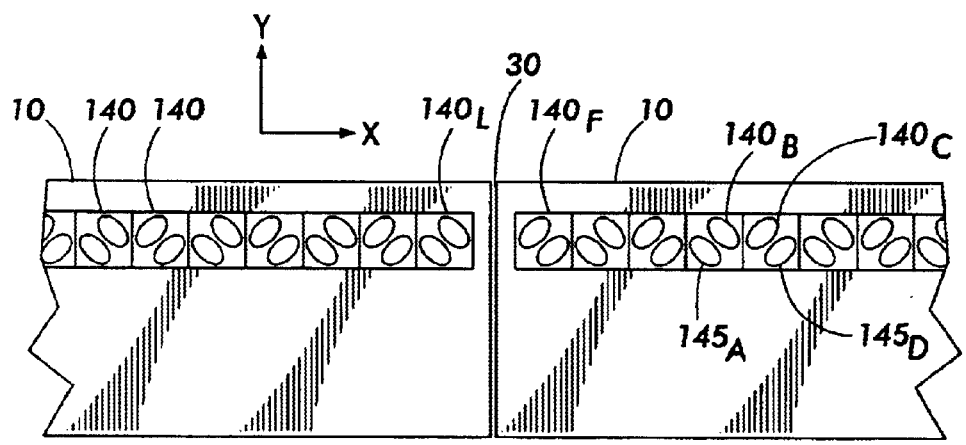
FIG. 12 is a plan view showing portions of a photosensitive array of photosites on two adjacent photosensitive chips in a ninth preferred embodiment of the present invention.

FIG. 12 shows a plan view of the relevant portions of two chips 10 at the general area of juxtaposition along a full width linear photosensitive array comprising a plurality of the chips 10, each having a linear photosensitive array of the geometric shapes according to the ninth embodiment of the present invention. In the ninth embodiment, the linear photosensitive array includes an array of generally rectangular buttable photocollection areas 140, wherein each photocollection area 140 includes two elliptical shapes 145. Each chip 10 has two outer photocollection areas denoted as 140$_F$ (first buttable rectangular shaped photocollection area) and 140$_L$ (last buttable rectangular shaped photocollection area). The other buttable rectangular shaped photocollection areas 140 are inner photocollection areas. All of the photocollection areas preferably have the same surface area and are regularly spaced on the chips 10. Each elliptical shape 145 preferably consists of one photodiode, photogate or other photodetection device.

Figure 13:
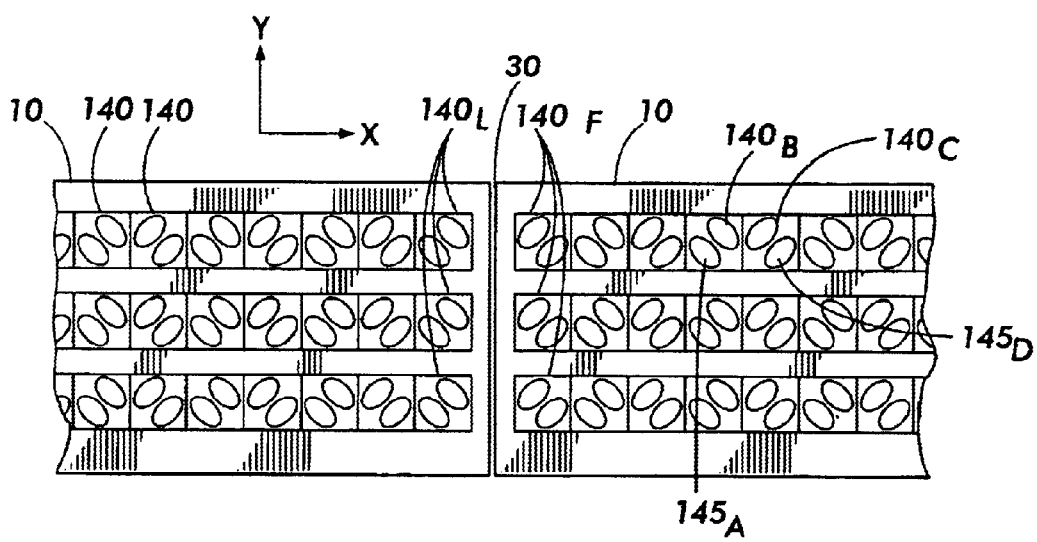
FIG. 13 is a plan view showing portions of a photosensitive array of photosites on two adjacent photosensitive chips in a tenth preferred embodiment of the present invention.

FIG. 13 shows a plan view of the relevant portions of two chips 10 at the general area of juxtaposition along a full width two dimensional photosensitive array comprising a plurality of the chips 10, each having a two dimensional photosensitive array of the geometric shapes according to the tenth embodiment of the present invention. Preferably, there are three rows of geometric shapes for the three primary colors. In the tenth embodiment, the two dimensional photosensitive array includes an array of generally rectangular buttable photocollection areas 140, wherein each photocollection area 140 includes two elliptical shapes 145. Each chip 10 has outer photocollection areas denoted as 140$_F$ (first buttable rectangular shaped photocollection area) and 140$_L$ (last buttable rectangular shaped photocollection area). The other buttable rectangular shaped photocollection areas 140 are inner photocollection areas. All of the photocollection areas preferably have the same surface area and are regularly spaced on the chips 10. Each elliptical shape 145 preferably consists of one photodiode, photogate or other photodetection device.

In the ninth and tenth embodiments, a first elliptical shape 145$_A$ from one photocollection area 140 and a first elliptical shape 145$_C$ from another photocollection area 140 form one photosite. A second elliptical shape 145$_B$ from the one photocollection area 140 and a second elliptical shape 145$_D$ from the other photocollection area 140 form another photosite. The advantage of the geometric configuration of the ninth and tenth embodiments is that these embodiments lower the modulation transfer function in the x-direction or fast scan direction by spreading the photosites over larger regions, and thus reduce the Moiré patterns to improve image quality. In addition, all of the geometric centers of the photosites are collinear and the outer photocollection areas 140$_F$ and 140$_L$ are buttable, which further improves image quality. Moreover, the position of the elliptical shapes 145$_A$–145$_D$ within their respective photocollection areas 140 can change. Therefore, several different geometric configurations may be produced, while spreading the surface area of a photosite over two different photocollection areas 140.

Figure 14:
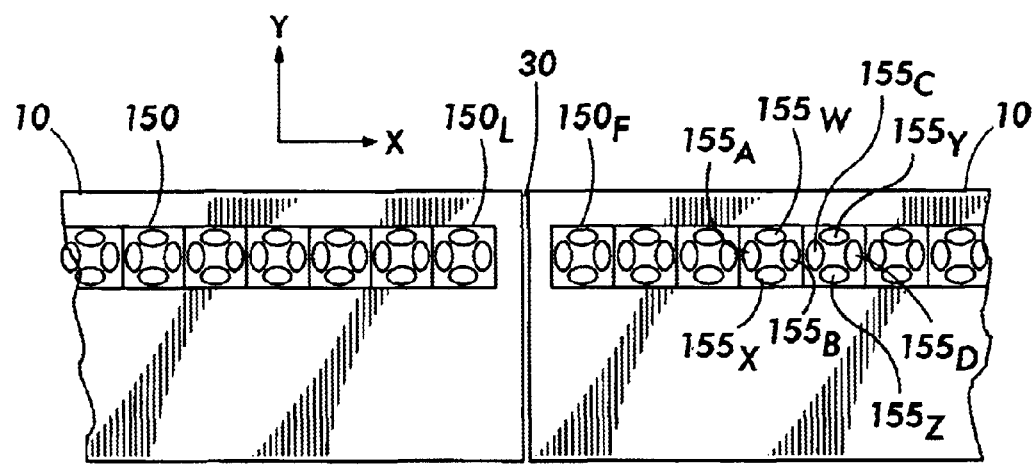
FIG. 14 is a plan view showing portions of a photosensitive array of photosites on two adjacent photosensitive chips in a eleventh preferred embodiment of the present invention.

FIG. 14 shows a plan view of the relevant portions of two chips 10 at the general area of juxtaposition along a full width linear photosensitive array comprising a plurality of the chips 10, each having a linear photosensitive array of the geometric shapes according to the eleventh embodiment of the present invention. In the eleventh embodiment, the linear photosensitive array includes an array of generally buttable rectangular shaped photocollection areas 150, wherein each photocollection area 150 includes four elliptical shapes 155. Each chip 10 has two outer photocollection areas denoted as 150$_F$ (first buttable rectangular shaped photocollection area) and 150$_L$ (last buttable rectangular shaped photocollection area). The other buttable rectangular shaped photocollection areas 150 are inner photocollection areas. All of the photocollection areas preferably have the same surface area and are regularly spaced on the chips 10. Each elliptical shape 155 preferably consists of one photodiode, photogate or other photodetection device.

Figure 15:
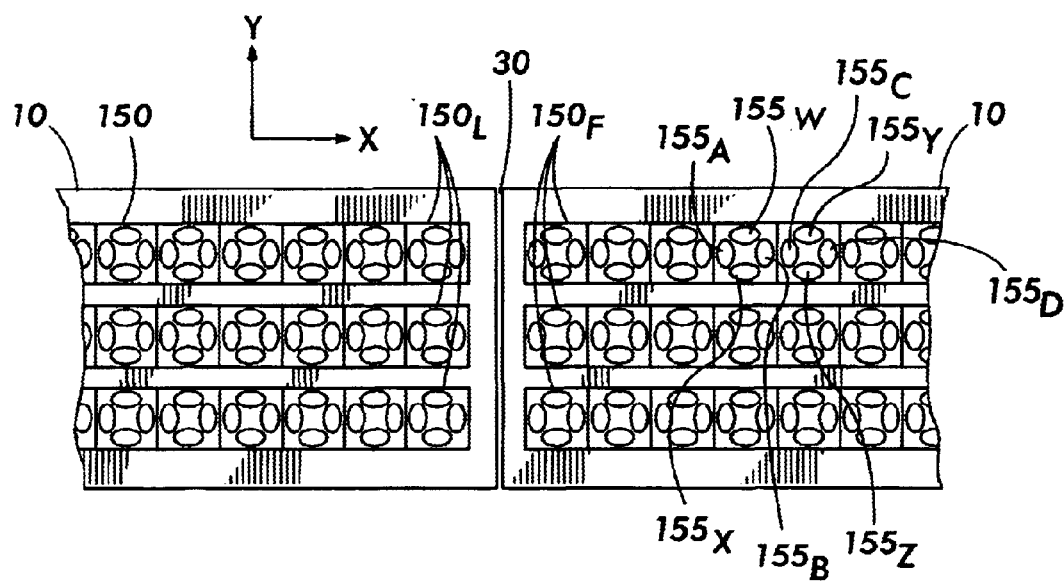
FIG. 15 is a plan view showing portions of a photosensitive array of photosites on two adjacent photosensitive chips in a twelfth preferred embodiment of the present invention.

FIG. 15 shows a plan view of the relevant portions of two chips 10 at the general area of juxtaposition along a full width two dimensional photosensitive array comprising a plurality of the chips 10, each having a two dimensional photosensitive array of the geometric shapes according to the twelfth embodiment of the present invention. Preferably, there are three rows of geometric shapes for the three primary colors. In the twelfth embodiment, the two dimensional photosensitive array includes an array of generally buttable rectangular shaped photocollection areas 150, wherein each photocollection area 150 includes four elliptical shapes 155. Each chip 10 has outer photocollection areas denoted as $150_F$ (first buttable rectangular shaped photocollection area) and $150_L$ (last buttable rectangular shaped photocollection area). The other buttable rectangular shaped photocollection areas 150 are inner photocollection areas. All of the photocollection areas preferably have the same surface area and are regularly spaced on the chips 10. Each elliptical shape 155 preferably consists of one photodiode, photogate or other photodetection device.

In the eleventh and twelfth embodiments, a first elliptical shape $155_A$ and a second elliptical shape $155_B$ from one photocollection area 150 added to a first elliptical shape $155_C$ and a second elliptical shape $155_D$ from another photocollection area 150 form one photosite. A third elliptical shape $155_W$ and a fourth elliptical shape $155_X$ from the one photocollection area 150 added to a third elliptical shape $155_Y$ and a fourth elliptical shape $155_Z$ from the other photocollection area 150 form another photosite. The advantage of the geometric configurations of the eleventh and twelfth embodiments is that these embodiments lower the modulation transfer function in the x-direction or fast scan direction by spreading the photosites over larger regions, and thus reduce the Moiré patterns to improve image quality. In addition, the geometric centers of all of the photosites are preferably collinear and uniformly spaced. Also, the outer photocollection areas $150_L$ and $150_F$ are buttable. These items further improve image quality.

Further, in the eleventh and twelfth embodiments, several different geometric configurations may be produced, while spreading the surface area of a photosite over two different photocollection areas 150 by changing the elliptical shapes 155, which form one photosite. For example, elliptical shapes $155_A$, $155_W$, $155_Y$ and $155_C$ may form one photosite while elliptical shapes $155_B$, $155_X$, $155_Z$ and $155_D$ form another photosite. Therefore, several different geometric configurations may be produced, while spreading the surface area of a photosite over two different photocollection areas 150. Moreover, the position of the elliptical shapes $155_A$–$155_D$ within their respective photocollection areas 150 can change.

In addition, although the ninth through twelfth embodiments have used elliptical shapes in different photocollection areas to spread out the surface areas of the photosites over a larger region (two photocollection areas), it is understood that other shapes may be substituted for the elliptical shapes to spread out the surface areas of the photosites over a larger region. It is also understood that the photosites do not need to be formed from elliptical shapes in adjacent photocollection areas. One or more elliptical shapes from two or more photocollection areas may be electrically combined to form one photosite.

Figure 16:
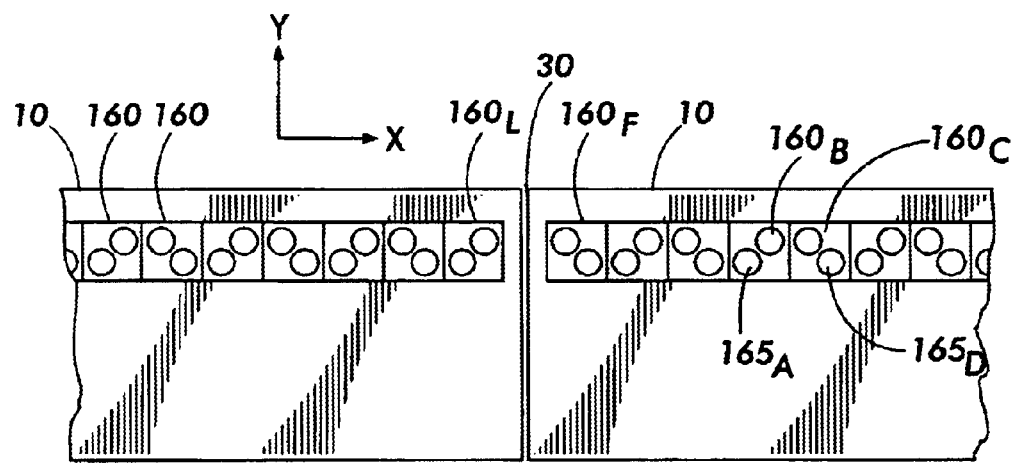
FIG. 16 is a plan view showing portions of a photosensitive array of photosites on two adjacent photosensitive chips in a thirteenth preferred embodiment of the present invention.

FIG. 16 shows a plan view of the relevant portions of two chips 10 at the general area of juxtaposition along a full width linear photosensitive array comprising a plurality of the chips 10, each having a linear photosensitive array of the geometric shapes according to the thirteenth embodiment of the present invention. In the thirteenth embodiment, the linear photosensitive array includes an array of generally rectangular buttable photocollection areas 160, wherein each photocollection area 160 includes two circular shapes 165. Each chip 10 has two outer photocollection areas denoted as $160_F$ (first buttable rectangular shaped photocollection area) and $160_L$ (last buttable rectangular shaped photocollection area). The other buttable rectangular shaped photocollection areas 160 are inner photocollection areas. All of the photocollection areas preferably have the same surface area and are regularly spaced on the chips 10. Each circular shape 165 preferably consists of one photodiode, photogate or other photodetection device.

Figure 17:
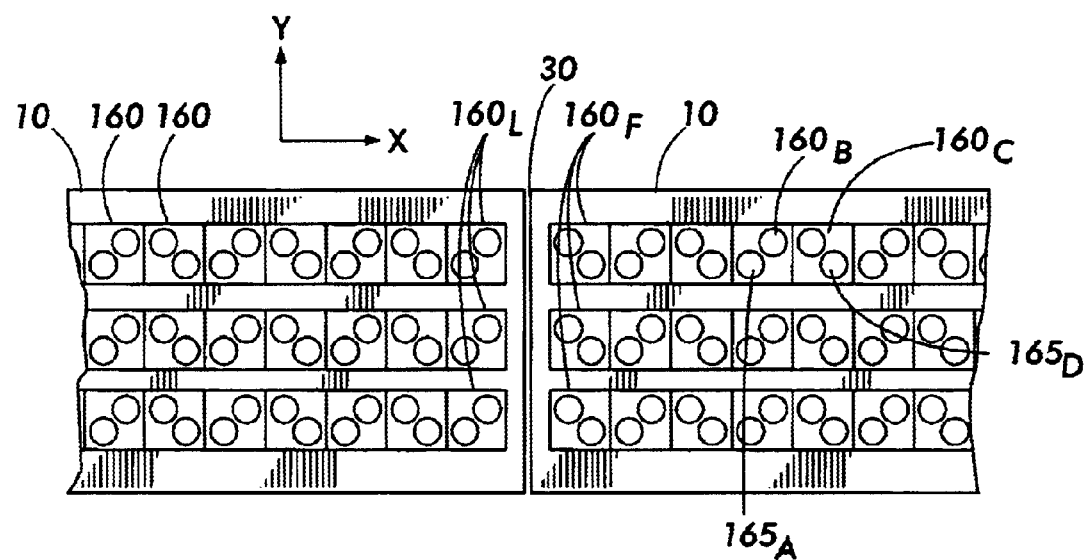
FIG. 17 is a plan view showing portions of a photosensitive array of photosites on two adjacent photosensitive chips in a fourteenth preferred embodiment of the present invention.

FIG. 17 shows a plan view of the relevant portions of two chips 10 at the general area of juxtaposition along a full width two dimensional photosensitive array comprising a plurality of the chips 10, each having a two dimensional photosensitive array of the geometric shapes according to the fourteenth embodiment of the present invention. Preferably, there are three rows of geometric shapes for the three primary colors. In the fourteenth embodiment, the two dimensional photosensitive array includes an array of generally rectangular buttable photocollection areas 160, wherein each photocollection area 160 includes two circular shapes 165. Each chip 10 has outer photocollection areas denoted as $160_F$ (first buttable rectangular shaped photocollection area) and $160_L$ (last buttable rectangular shaped photocollection area). The other buttable rectangular shaped photocollection areas 160 are inner photocollection areas. All of the photocollection areas preferably have the same surface area and are regularly spaced on the chips 10. Each circular shape 165 preferably consists of one photodiode, photogate or other photodetection device.

In the thirteenth and fourteenth embodiments, a first circular shape $165_A$ from one photocollection area 160 and a first circular shape $165_C$ from another photocollection area 160 form one photosite. A second circular shape $165_B$ from the one photocollection area 160 and a second circular shape $165_D$ from the other photocollection area 160 form another photosite. The advantage of the geometric configuration of the thirteenth and fourteenth embodiments is that these embodiments lower the modulation transfer function in the x-direction or fast scan direction by spreading the photosites over larger regions, and thus reduce the Moiré patterns to improve image quality. In addition, all of the geometric centers of the photosites are collinear and the outer photocollection areas $160_F$ and $160_L$ are buttable, which further improves image quality. Moreover, the position of the circular shapes $165_A$–$165_D$ within their respective photocollection areas 160 can change. Therefore, several different geometric configurations may be produced, while spreading the surface area of a photosite over two different photocollection areas 160.

Figure 18:
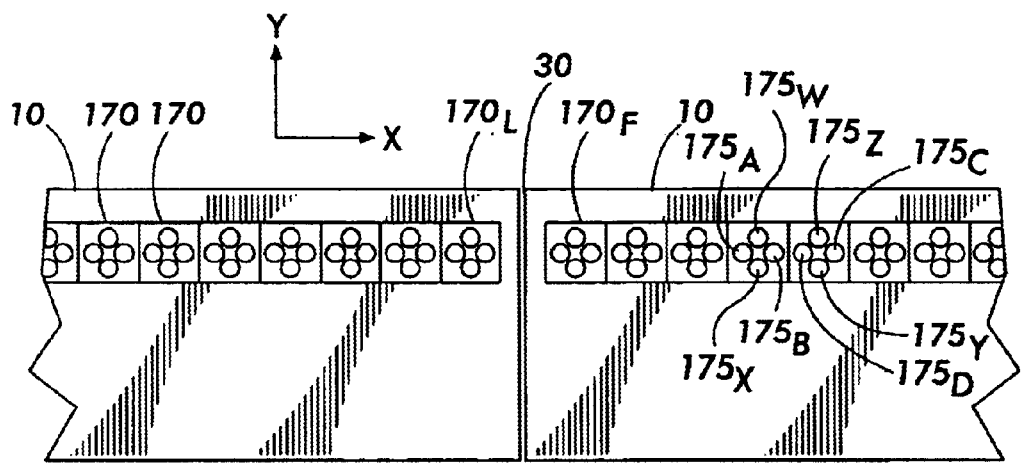
FIG. 18 is a plan view showing portions of a photosensitive array of photosites on two adjacent photosensitive chips in a fifteenth preferred embodiment of the present invention.

FIG. 18 shows a plan view of the relevant portions of two chips 10 at the general area of juxtaposition along a full width linear photosensitive array comprising a plurality of the chips 10, each having a linear photosensitive array of the geometric shapes according to the fifteenth embodiment of the present invention. In the fifteenth embodiment, the linear photosensitive array includes an array of generally buttable rectangular shaped photocollection areas 170, wherein each photocollection area 170 includes four circular shapes 175. Each chip 10 has two outer photocollection areas denoted as $170_F$ (first buttable rectangular shaped photocollection area) and $170_L$ (last buttable rectangular shaped photocollection area). The other buttable rectangular shaped photocollection areas 170 are inner photocollection areas. All of the photocollection areas preferably have the same surface area and are regularly spaced on the chips 10. Each circular shape 175 preferably consists of one photodiode, photogate or other photodetection device.

Figure 19:
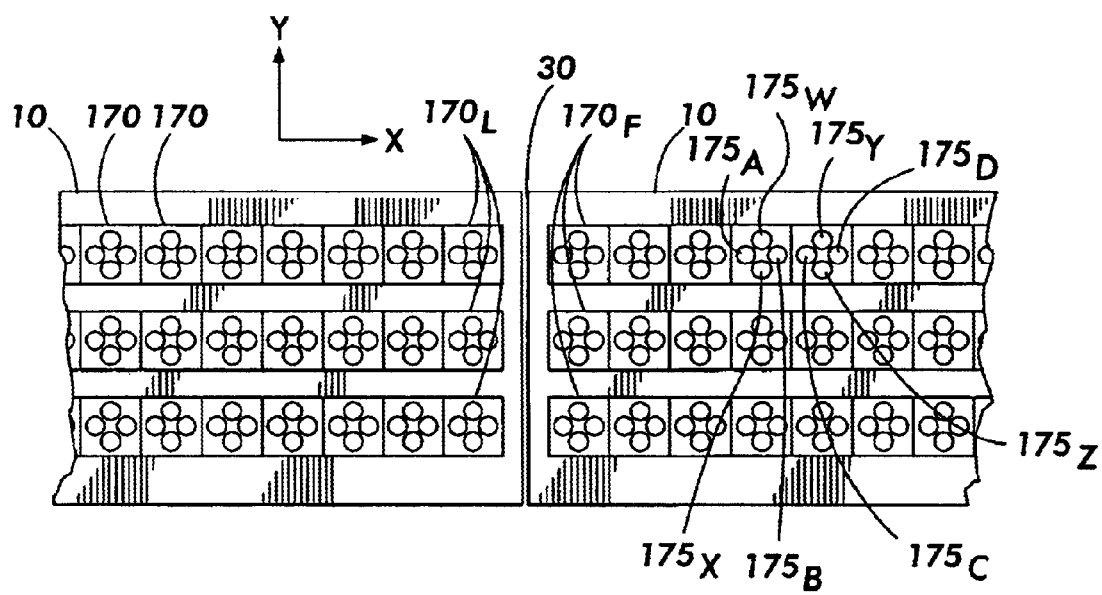
FIG. 19 is a plan view showing portions of a photosensitive array of photosites on two adjacent photosensitive chips in a sixteenth preferred embodiment of the present invention.

FIG. 19 shows a plan view of the relevant portions of two chips 10 at the general area of juxtaposition along a full width two dimensional photosensitive array comprising a plurality of the chips 10, each having a two dimensional photosensitive array of the geometric shapes according to the sixteenth embodiment of the present invention. Preferably, there are three rows of geometric shapes for the three primary colors. In the sixteenth embodiment, the two dimensional photosensitive array includes an array of generally buttable rectangular shaped photocollection areas 170, wherein each photocollection area 170 includes four circular shapes 175. Each chip 10 has outer photocollection areas denoted as $170_F$ (first buttable rectangular shaped photocollection area) and $170_L$ (last buttable rectangular shaped photocollection area). The other buttable rectangular shaped photocollection areas 170 are inner photocollection areas. All of the photocollection areas preferably have the same surface area and are regularly spaced on the chips 10. Each circular shape 175 preferably consists of one photodiode, photogate or other photodetection device.

In the fifteenth and sixteenth embodiments, a first circular shape $175_A$ and a second circular shape $175_B$ from one photocollection area 170 added to a first circular shape $175_C$ and a second circular shape $175_D$ from another photocollection area 170 form one photosite. A third circular shape $175_W$ and a fourth circular shape $175_X$ from the one photocollection area 170 added to a third circular shape $175_Y$ and a fourth circular shape $175_Z$ from the other photocollection area 170 form another photosite. The advantage of the geometric configurations of the fifteenth and sixteenth embodiments is that these embodiments lower the modulation transfer function in the x-direction or fast scan direction by spreading the photosites over larger regions, and thus reduce the Moiré patterns to improve image quality. In addition, the geometric centers of all of the photosites are preferably collinear and uniformly spaced. Also, the outer photocollection areas $170_L$ and $170_F$ are buttable. These items further improve image quality.

Further, in the fifteenth and sixteenth embodiments, several different geometric configurations may be produced, while spreading the surface area of a photosite over two different photocollection areas 170 by changing the circular shapes 175, which form one photosite. For example, circular shapes $175_A$, $175_W$, $175_Y$ and $175_C$ may form one photosite while circular shapes $175_B$, $175_X$, $175_Z$ and $175_D$ form another photosite. Therefore, several different geometric configurations may be produced, while spreading the surface area of a photosite over two different photocollection areas 170. Moreover, the position of the circular shapes $175_A$–$175_D$ within their respective photocollection areas 170 can change.

In addition, although the thirteenth through sixteenth embodiments have used circular shapes in different photocollection areas to spread out the surface areas of the photosites over a larger region (two photocollection areas), it is understood that other shapes may be substituted for the circular shapes to spread out the surface areas of the photosites over a larger region. It is also understood that the photosites in the thirteenth through sixteenth embodiments do not need to be formed from circular shapes in adjacent photocollection areas. One or more circular shapes from two or more photocollection areas may be electrically combined to form one photosite.

Figure 20:
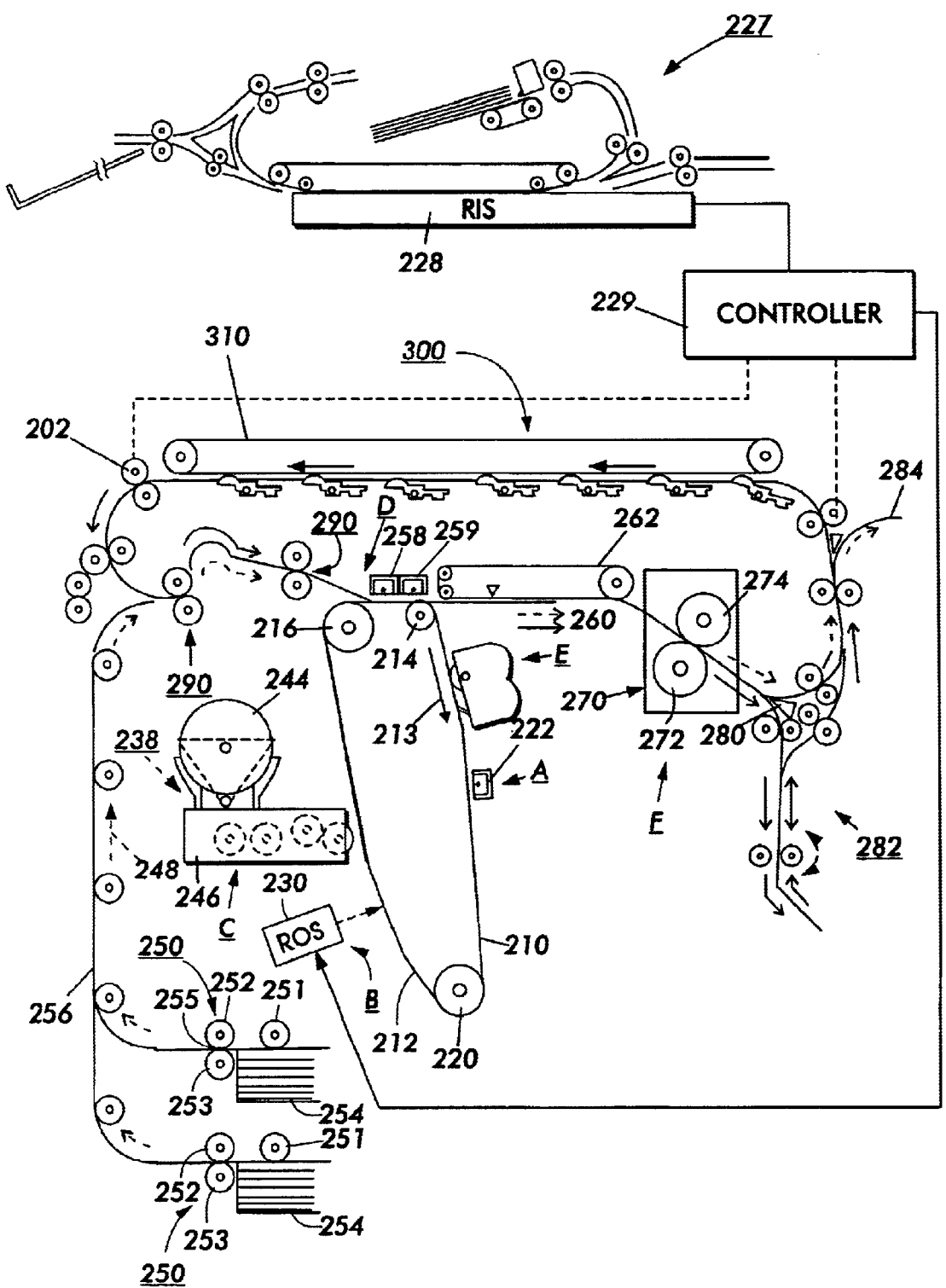
FIG. 20 is a partial schematic elevational view of a digital copier.

FIG. 20 is a partial schematic elevational view of a digital copier, which can utilize the photosensitive chips 10 of the present invention. However, it is understood that the photosensitive chips may be used in any imaging device.

An original document is positioned in a document handler 227 on a raster input scanner (RIS) indicated generally by reference numeral 228. The RIS contains document illumination lamps, optics, a mechanical scanning device and a plurality of photosensitive chips 10 as shown in FIG. 1. The photosensitive chips 10 may include any one of the photosensitive arrays described above. The RIS captures the entire original document and converts it to a series of raster scan lines. This information is transmitted to an electronic subsystem (ESS) which controls a raster output scanner (ROS).

The digital copier employs a photoconductive belt 210. Preferably, the photoconductive belt 210 is made from a photoconductive material coated on a ground layer, which, in turn, is coated on an anti-curl backing layer. Belt 210 moves in the direction of arrow 213 to advance successive portions sequentially through the various processing stations disposed about the path of movement thereof. Belt 210 is entrained about stripping roller 214, tensioning roller 220 and drive roller 216. As roller 216 rotates, it advances belt 210 in the direction of arrow 213.

Initially, a portion of the photoconductive surface passes through charging station A. At charging station A, a corona generating device indicated generally by the reference numeral 222 charges the photoconductive belt 210 to a relatively high, substantially uniform potential.

At an exposure station B, a controller or electronic subsystem (ESS), indicated generally by reference numeral 229, receives the image signals representing the desired output image and processes these signals to convert them to a continuous tone or grayscale rendition of the image which is transmitted to a modulated output generator, for example the raster output scanner (ROS), indicated generally by reference numeral 230. Preferably, ESS 229 is a self-contained, dedicated minicomputer. The image signals transmitted to ESS 229 may originate from a RIS 228 as described above or another type of scanner utilizing the photosensitive chips 10, thereby enabling the digital copier to serve as a remotely located printer for one or more scanners. Alternatively, the printer may serve as a dedicated printer for a high-speed computer or for one or more personal computers. The signals from ESS 229, corresponding to the continuous tone image desired to be reproduced by the printer, are transmitted to ROS 230. ROS 230 includes a laser with rotating polygon mirror blocks. The ROS 230 will expose the photoconductive belt 210 to record an electrostatic latent image thereon corresponding to the continuous tone image received from ESS 229. As an alternative, ROS 230 may employ a photosensitive array of light emitting diodes (LEDs) arranged to illuminate the charged portion of photoconductive belt 210 on a raster-by-raster basis.

After the electrostatic latent image has been recorded on photoconductive surface 212, belt 210 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 244, dispenses toner particles into developer housing 246 of developer unit 238.

With continued reference to FIG. 13, after the electrostatic latent image is developed, the toner powder image present on belt 210 advances to transfer station D. A print sheet 248 is advanced to the transfer station, D, by a sheet feeding apparatus, 250. Preferably, sheet feeding apparatus 250 includes a nudger roll 251 which feeds the uppermost sheet of stack 254 to nip 255 formed by feed roll 252 and retard roll 253. Feed roll 252 rotates to advance the sheet from stack 254 into vertical transport 256. Vertical transport 256 directs the advancing sheet 248 of support material into the registration transport 290 and past image transfer station D to receive an image from photoreceptor belt 210 in a timed sequence so that the toner powder image formed thereon contacts the advancing sheet 248 at transfer station D. Transfer station D includes a corona generating device 258, which sprays ions onto the back side of sheet 248. This attracts the toner powder image from photoconductive surface 212 to sheet 248. The sheet is then detached from the photoreceptor by corona generating device 259 which sprays oppositely charged ions onto the back side of sheet 248 to assist in removing the sheet from the photoreceptor. After transfer, sheet 248 continues to move in the direction of arrow 260 by way of belt transport 262 which advances sheet 248 to fusing station F.

Fusing station F includes a fuser assembly indicated generally by the reference numeral 270 which permanently affixes the transferred toner powder image to the copy sheet. Preferably, fuser assembly 270 includes a heated fuser roller 272 and a pressure roller 274 with the powder image on the copy sheet contacting fuser roller 272. The pressure roller 274 is loaded against the fuser roller 272 to provide the necessary pressure to fix the toner powder image to the copy sheet. The fuser roller 272 is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 272. Or alternatively, release agent is stored in a presoaked web (not shown) and applied to the fuser roll 272 by pressing the web against fuser roll 272 and advancing the web at a slow speed.

The sheet then passes through fuser 270 where the image is permanently fixed or fused to the sheet. After passing through fuser 270, a gate 280 either allows the sheet to move directly via output 284 to a finisher or stacker, or deflects the sheet into the duplex path 300, specifically, first into single sheet inverter 282 here. That is, if the sheet is either a simplex sheet, or a completed duplex sheet having both side one and side two images formed thereon, the sheet will be conveyed via gate 280 directly to output 284. However, if the sheet is being duplexed and is then only printed with a side one image, the gate 280 will be positioned to deflect that sheet into the inverter 282 and into the duplex loop path 300, where that sheet will be inverted and then fed to acceleration nip 202 and belt transports 310, for recirculation back through transfer station D and fuser 270 for receiving and permanently fixing the side two image to the backside of that duplex sheet, before it exits via exit path 284.

After the print sheet is separated from photoconductive surface 212 of belt 210, the residual toner/developer and paper fiber particles adhering to photoconductive surface 212 are removed therefrom at cleaning station E. Cleaning station E includes a rotatably mounted fibrous brush in contact with photoconductive surface 212 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 212 with light to dissipate any residual electrostatic charge remaining thereon prior to the charging thereof for the next successive imaging cycle.

Controller 229 regulates the various printer functions. The controller 229 is preferably a programmable microprocessor which controls all of the printer functions hereinbefore described. The controller 229 provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

We claim:

1. A photosensitive array having fast and slow scan directions, the photosensitive array comprising:
   a chip;
   an array of generally rectangular photocollection areas on the chip, each of the photocollection areas including first, second, third and fourth complementary shapes, wherein:
   the first and second complementary shapes of one photocollection area and the first and second complementary shapes of another photocollection area form one photosite; and
   each complementary shape has a photodetection device, each complementary shape has the same surface area and the photosites are collinear.

2. The photosensitive array as in claim 1, wherein said third and fourth complementary shapes of the one photocollection area and the third and fourth complementary shapes of said another photocollection area form another photosite.

3. The photosensitive array as in claim 1, wherein each complementary shape is a triangle.

4. The photosensitive array as in claim 1, wherein each complementary shape is a rounded triangle.

5. The photosensitive array as in claim 1, wherein said photosensitive array is mounted on a substrate adjacent to a second photosensitive array of complementary shaped photosites.

6. The photosensitive array as in claim 1, wherein said photosensitive array is a linear array.

7. The photosensitive array as in claim 1, wherein said photosensitive array is a two-dimensional array.

8. The photosensitive array as in claim 1, wherein:
   the array of generally rectangular photocollection areas on the chip extend from one end of the chip to the other;
   the photocollection areas are buttable; and
   the photosensitive array is especially adapted for end to end assembly with like arrays to form a full width array.

9. A photosensitive array having fast and slow scan directions, the photosensitive array comprising:
   a chip;
   an array of generally rectangular photocollection areas on the chip, each of the photocollection areas including first, second, third and fourth elliptical shapes, wherein:
   the first and second elliptical shapes of one photocollection area and the first and second elliptical shapes of another photocollection area form one photosite; and each elliptical shape has a photodetection device, each elliptical shape has the same surface area and the photosites are collinear.

10. The photosensitive array as in claim 9, wherein said third and fourth elliptical shapes of the one photocollection area and the third and fourth elliptical shapes of said another photocollection area form another photosite.

11. The photosensitive array as in claim 9, wherein said photosensitive array is mounted on a substrate adjacent to a second photosensitive array of elliptical shaped photosites.

12. The photosensitive array as in claim 9, wherein said photosensitive array is a linear array.

13. The photosensitive array as in claim 9, wherein said photosensitive array is a two-dimensional array.

14. The photosensitive array as in claim 9, wherein:

the array of generally rectangular photocollection areas on the chip extend from one end of the chip to the other;

the photocollection areas are buttable; and the photosensitive array is especially adapted for end to end assembly with like arrays to form a full width array.

15. The photosensitive array as in claim 9, wherein said elliptical shapes are circular shapes.

16. A digital copier comprising:

a raster input scanner scanning documents to generate digital image signals, the raster input scanner including a plurality of generally rectangular chips, which are assembled end to end on a substrate forming an array of generally rectangular buttable photocollection areas, each of the photocollection areas consisting of first, second, third and fourth complementary shapes, wherein the first and second complementary shapes of one photocollection area and the first and second complementary shapes of another photocollection area form one photosite, each complementary shape has a photodetection device, each complementary shape has the same surface area, and the photosites are collinear; and a controller directing a raster output scanner to expose a photoconductive belt to create an electrostatic latent image based on image signals received from the raster input scanner.

\* \* \* \* \*